United States Patent
Bertin et al.

(10) Patent No.: US 10,158,587 B2
(45) Date of Patent: Dec. 18, 2018

(54) COMMUNICATION BETWEEN A WEB APPLICATION INSTANCE CONNECTED TO A CONNECTION SERVER AND A CALLING ENTITY OTHER THAN SAID CONNECTION SERVER

(71) Applicant: ORANGE, Paris (FR)

(72) Inventors: Emmanuel Bertin, Luc-sur-Mer (FR); Stephane Cazeaux, Authie (FR)

(73) Assignee: ORANGE, Paris (FR)

( * ) Notice: Subject to any disclaimer, the term of this patent is extended or adjusted under 35 U.S.C. 154(b) by 325 days.

(21) Appl. No.: 14/762,110

(22) PCT Filed: Feb. 6, 2014

(86) PCT No.: PCT/FR2014/050225
§ 371 (c)(1),
(2) Date: Jul. 20, 2015

(87) PCT Pub. No.: WO2014/122402
PCT Pub. Date: Aug. 14, 2014

(65) Prior Publication Data
US 2015/0358263 A1    Dec. 10, 2015

(30) Foreign Application Priority Data

Feb. 7, 2013   (FR) ..................... 13 51071

(51) Int. Cl.
*H04L 12/58* (2006.01)
*H04L 29/08* (2006.01)
(Continued)

(52) U.S. Cl.
CPC .............. *H04L 51/046* (2013.01); *G06F 9/54* (2013.01); *H04L 67/02* (2013.01);
(Continued)

(58) Field of Classification Search
CPC ..... H04L 51/046; H04L 67/104; H04L 65/10; H04L 67/02; G06F 9/54; G06F 9/547
(Continued)

(56) References Cited

U.S. PATENT DOCUMENTS 6,883,015 B1    4/2005  Geen
7,296,076 B1 *  11/2007 Portolani ............ H04L 67/1027
                                                            709/217
(Continued)

OTHER PUBLICATIONS

Rosenbert J., Obtaining and Using Globally Routable User Agent URIs in the Session Initiation Protocol, Nov. 11, 2007, The IETF Trust, pp. 1,6,13-18.*

(Continued)

*Primary Examiner* — Patrice L Winder
*Assistant Examiner* — Lam H Duong
(74) *Attorney, Agent, or Firm* — Haverstock & Owens LLP

(57) ABSTRACT

A method for communicating between a caller entity and an instance of an application downloaded onto a user terminal and designed to be connected to a connection server. The method including obtaining an instance identifier of the application instance comprising a first and a second identifier, the second identifier being a pointer toward a host server and the first identifier representing the instance within the host server, and transmitting a notification destined for the application instance via the instance identifier.

11 Claims, 9 Drawing Sheets

Figure 1:
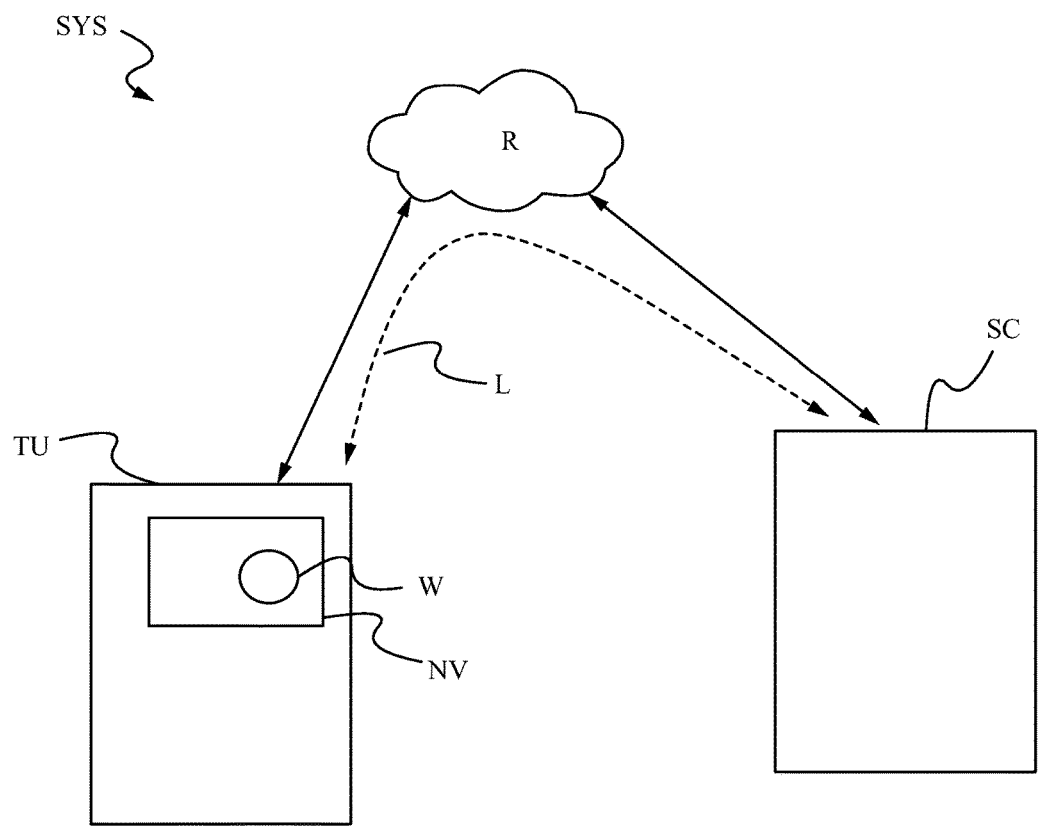

(51) Int. Cl.
    *G06F 9/54*     (2006.01)
    *H04W 4/60*    (2018.01)
    *G06F 9/50*     (2006.01)
(52) U.S. Cl.
    CPC ........... *H04L 67/1095* (2013.01); *H04W 4/60* (2018.02); *G06F 9/5055* (2013.01); *G06F 9/547* (2013.01); *G06F 2209/509* (2013.01); *G06F 2209/544* (2013.01); *H04L 67/141* (2013.01)
(58) Field of Classification Search
    USPC .......................................... 709/206, 203, 238
    See application file for complete search history.

(56) References Cited

U.S. PATENT DOCUMENTS

| | | | | |
|---|---|---|---|---|
| 8,635,300 | B2* | 1/2014 | Kvache | H04L 12/2809 709/217 |
| 2001/0044898 | A1* | 11/2001 | Benussi | H04L 41/5054 713/173 |
| 2002/0083191 | A1* | 6/2002 | Ryuutou | H04L 29/06 709/237 |
| 2002/0150092 | A1* | 10/2002 | Bontempi | H04L 12/1818 370/389 |
| 2008/0263126 | A1 | 10/2008 | Soman | |
| 2010/0150031 | A1* | 6/2010 | Allen | H04L 67/14 370/276 |
| 2010/0281107 | A1* | 11/2010 | Fallows | G06F 9/54 709/203 |
| 2012/0254373 | A1* | 10/2012 | Pujare | H04L 69/08 709/220 |
| 2013/0275492 | A1* | 10/2013 | Kaufman | H04L 63/029 709/203 |
| 2014/0040502 | A1* | 2/2014 | McClenahan | H04L 67/10 709/238 |
| 2014/0047322 | A1* | 2/2014 | Kim | G06F 17/2247 715/234 |
| 2014/0222930 | A1* | 8/2014 | Gangadharan | H04L 51/04 709/206 |
| 2014/0223453 | A1* | 8/2014 | Li | G06F 9/547 719/330 |
| 2015/0236905 | A1* | 8/2015 | Bellan | H04L 41/0806 709/222 |

OTHER PUBLICATIONS

Sazali H. Muhammad et al., "Cross-Domain Data Exchanges for Web Application", Wireless Communications and Applications, IET International Conference, IEE Oct. 8, 2012, pp. 1-6.

Rosenberg Cisco J., Obtaining and Using Globally Routable User Agent Uris in the Session Initiation Protocol,Oct. 11, 2007, XP015058968.

Sebastien Cubaud, "IDSER:Inter-Domain Service Enable for RTC-WEB", ETSI Future Network Technologies Workshop 2011, Sep. 26-27, 2011, pp. 1-17.

Lin Li et al., "Research on the integration of RTCWeb technology with IP multimedia subsystem", Image and Signal Processing, 2012 5th International Congress on, IEE, Oct. 16, 2012.

Rosenberg M. Kaufman et al. An Architectural Framework for Browser BasedReal-Time Communications, Feb. 8, 2011, pp. 1-13, XP015073876.

* cited by examiner

COMMUNICATION BETWEEN A WEB APPLICATION INSTANCE CONNECTED TO A CONNECTION SERVER AND A CALLING ENTITY OTHER THAN SAID CONNECTION SERVER

The invention relates to the field telecommunications and, more particularly, to the field of Web applications.

In a known manner, a Web application (or "webapp") is a software application downloaded within a web browser instance of a terminal of a user and is executed within the same instance of the web browser of said terminal.

Also, in a known manner, a web browser enables communications with the world of the Web, in other words communications with remote servers via the Internet network.

A mechanism called webRTC (for "web Real Time Communication") allows communications to be effected in real time between two web browsers. A Web application downloaded over each web browser allows communication streams to be transmitted and received.

The mechanisms allowing calls to be transmitted and received are not specified in the webRTC works and are left to the implementation of each service provider.

The current mechanisms for transmitting or receiving calls use web applications based on existing protocols, for example SIP or XMPP, implementing a protocol stack. These mechanisms do not allow two Web applications from two different operators to be made to communicated.

Emerging works are looking at developing communications services based on a websocket protocol, defined by the IETF (for "Internet Engineering Task Force") in the RFC (for "Request For Comments") 6455. The websocket protocol allows a communication channel between a web browser and a remote server, typically a web server, to be established and made available. This communication channel, called "websocket connection", is a bidirectional and full-duplex channel, in other words a bidirectional channel for which sending and receiving can be carried out simultaneously between the web browsers and the web servers. This protocol is based on the TCP protocol (for "Transmission Control Protocol") for the transport of data. It allows a Web application installed on a web browser to be notified of a change of state of the server and allows data to be sent in "push" mode from the server to the Web application without the latter having to generate a request.

FIG. 1 shows a system SYS of the prior art.

The system SYS comprises a user terminal TU and a connection server SC capable of accessing a communications network R.

The terminal TU comprises a web browser NV for accessing the Internet network.

An instance of a Web application W has been installed in the web browser NV during in an initial step. The installation of the Web application instance W is conventionally carried out by accessing a server (not shown) and downloading the application instance from this server.

The downloaded application instance W contains the address of the connection server SC.

When an execution of the Web application instance W is launched, a request for establishment of a connection is transmitted to the connection server SC.

Upon receiving this request for establishment of a connection, a communication channel L is established between the connection server SC and the Web application instance W via the telecommunications network R and the web browser NV of the terminal TU.

In this architecture, only the connection server SC knows how to identify the Web application instance W connected to it. It is not currently possible for another entity, (such as for example a server, an instance of a Web application connected to another connection server or to another application instance) to contact the Web application W. For example, it is not possible to send a notification to or to call the Web application W.

There therefore exists a need for an entity other than the connection server to which an application instance is attached to contact this application instance.

The invention aims to improve the situation.

For this purpose, the invention relates to a method for communication between a caller entity and an instance of an application downloaded onto a user terminal and designed to be connected to a connection server, characterized in that it comprises the following steps, implemented in the caller entity:

obtaining of an instance identifier of said application instance, said identifier comprising a first and a second identifier, the second identifier being a pointer toward a host server and the first identifier representing said instance within said host server;

transmission of a notification destined for said application instance by means of said instance identifier obtained.

The instance identifier allows the application instance to be identified in a unique manner within the network. The second identifier allows a host server to be addressed. The first identifier subsequently allows the host server to identify the associated connection server then the connection server to identify the application instance to be contacted from amongst the application instances that are connected to it.

Thanks to the instance identifier, a notification transmitted by an entity of the network can be addressed to an instance of an application. It is thus possible for a caller entity, such as a server or another instance of another application, to contact an application instance.

According to one particular embodiment of the method of communication, the procurement step comprises a step for sending a request of instance identifier comprising a user identifier and a step for receiving a response to said request containing said instance identifier.

A user identifier is for example a telephone number or an address of a messaging service associated with a user. The user identifier is used to obtain an instance identifier of an application instance executed by this user.

The instance identifier is assigned for an application instance connected to a connection server. This is in principle temporary.

According to one particular embodiment of the method of communication, said application instance is an instance of a first application connected to a first connection server and the caller entity is an instance of a second application connected to a second connection server.

It is thus possible for an application instance to contact a second application instance.

According to one particular embodiment of the method of communication implemented alone or in combination with the preceding embodiments, the procurement step comprises a step for receiving a message containing the instance identifier transmitted by said application instance.

In this embodiment, the instance identifier determined during the connection of an application instance to the connection server is transmitted to the application instance. The application instance can then transmit this identifier to one or more remote entities, for example servers. The reception by a remote entity, of a message containing an instance identifier allows this remote entity to contact the application instance associated with the instance identifier received.

The reception of the instance identifier generated upon the initiative of an application instance is a simple means for a caller entity, for example a server or an instance of another application, to obtain said identifier.

The invention also relates to a connection method implemented by a connection server, characterized in that it comprises, following the reception of a request for establishment of a connection originating from an instance of an application downloaded onto a terminal of a user, a step for ordering a determination of an application instance identifier comprising a first and a second identifier, the second identifier being a pointer toward a host server and the first identifier representing said instance within said host server.

The instance identifier determined during the connection of an application instance to a connection server allows said application instance to be contacted by a caller entity.

According to one particular feature of the connection method, the second identifier is a domain name associated with the host server.

A domain name is a simple means of addressing the host server.

The domain name associated with the host server is an absolute or relative domain name.

In the case where the domain name is an absolute domain name of the connection server, the host server is the connection server and the notifications are directly transmitted to the connection server by a caller entity or a service management server for this entity. The transmission of the notifications is simple.

A relative domain name allows the architecture of the domain to be hidden from the entities foreign to this domain.

According to one particular embodiment, the connection method comprises a step for transmission of said identifier of said instance with a view to the recording of said instance identifier in association with a user identifier The recording of an instance identifier in association with a user identifier allows a remote entity to obtain an instance identifier from a user identifier. This entity can subsequently use this instance identifier in order to contact the application instance to which the instance identifier has been assigned.

According to one particular embodiment, the connection method comprises a step for analyzing the request for establishment of a connection received in order to determine if it comprises an instance identifier and the step for ordering a determination of an instance identifier is executed if said request for establishment of a connection does not comprise an instance identifier.

In this embodiment, an assigned instance identifier may be re-used during a later connection of the application instance to the connection server.

This avoids having to determine a new instance identifier at each connection of the application instance, in other words each time that the application instance is launched.

Re-using an instance identifier also simplifies the procedure for transmission of a notification for the caller entities.

This embodiment is particularly well adapted to the case where unexpected interruptions occur in the communication channel established between an application instance and a connection server.

According to one particular embodiment, the connection method comprises a step for receiving a notification containing said instance identifier, and a step for transmission of said notification to said application instance.

A notification transmitted by a caller entity is received by the connection server and retransmitted by the latter to the application instance associated with the instance identifier.

According to one particular embodiment, the connection method comprises, following the reception of the notification, a step for sending a wake-up message to the user terminal and a step for receiving a second request for establishment of a connection, said request comprising said instance identifier.

This embodiment is particularly well adapted to the case where an application instance has been disconnected from the connection server. The wake-up message transmitted by the connection server to the terminal allows the user to be informed of the arrival of a notification at the connection server in the absence of a connection of the application instance. The user can then order the continuation of the execution of the application instance, for example by re-launching the execution of the application instance, thus allowing the restoration of the communication channel between the application instance and the connection server and the transmission by the connection server of the pending notification.

The invention also relates to a caller entity characterized in that it comprises:
  a module for obtaining an instance identifier for an instance of an application downloaded onto a user terminal, said instance identifier comprising a first and a second identifier, the second identifier being a pointer toward a host server and the first identifier representing said instance within said host server;
  a module for transmission of a notification destined for said application instance by means of said instance identifier obtained.

The invention also relates to a connection server comprising means for receiving a request for establishment of a connection originating from an instance of an application downloaded onto a terminal of a user, characterized in that it comprises a module for ordering a determination of an application instance identifier comprising a first and a second identifier, the second identifier being a pointer toward a host server and the first identifier representing said instance within said host server.

The invention furthermore relates to a computer program product comprising instructions for implementing the steps of the communication method such as previously described, when it is loaded onto and executed by a processor.

The invention relates finally to a computer program product comprising instructions for implementing the steps of the connection method such as previously described, when it is loaded onto and executed by a processor.

Figure 2:
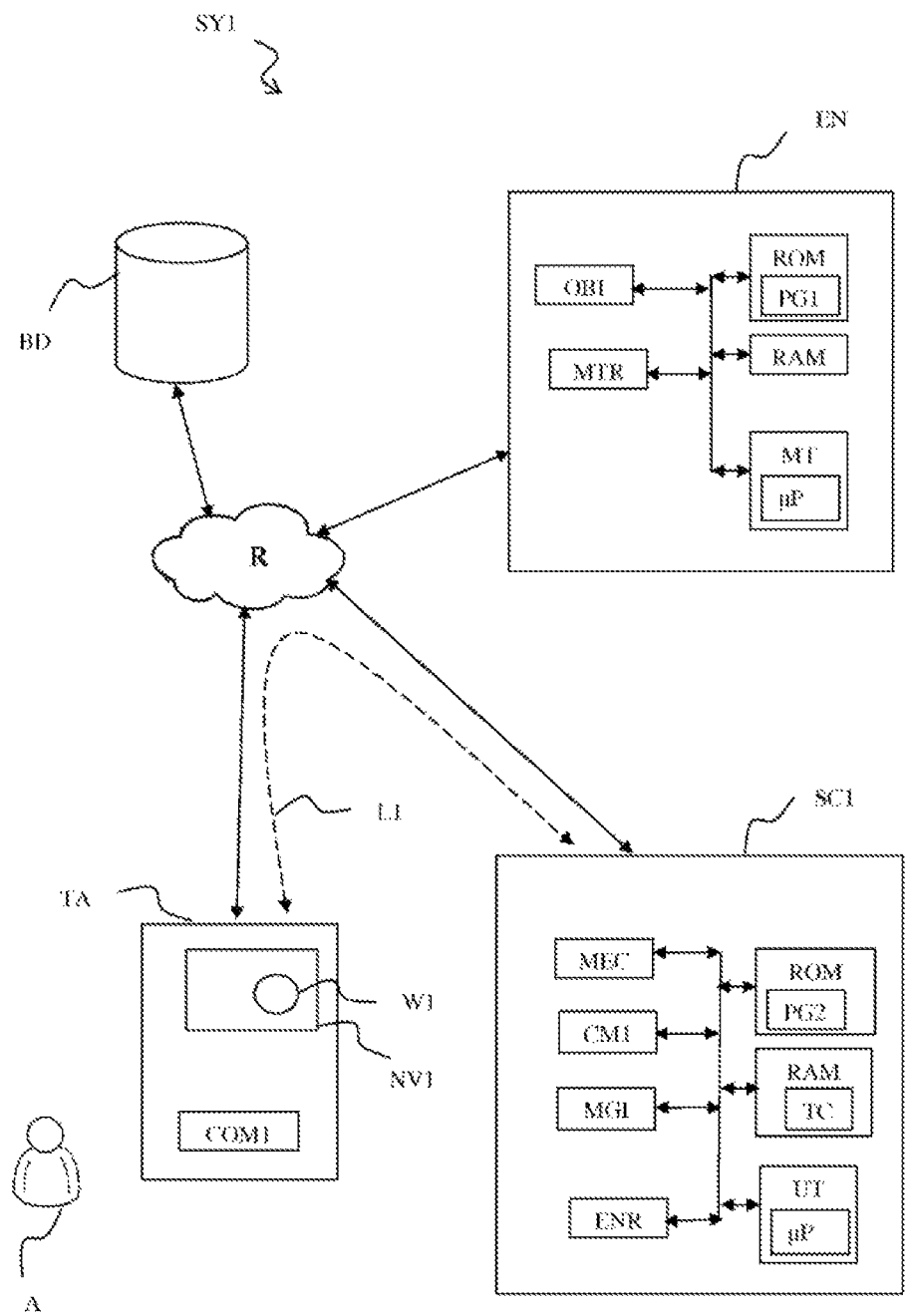
Figure 3:
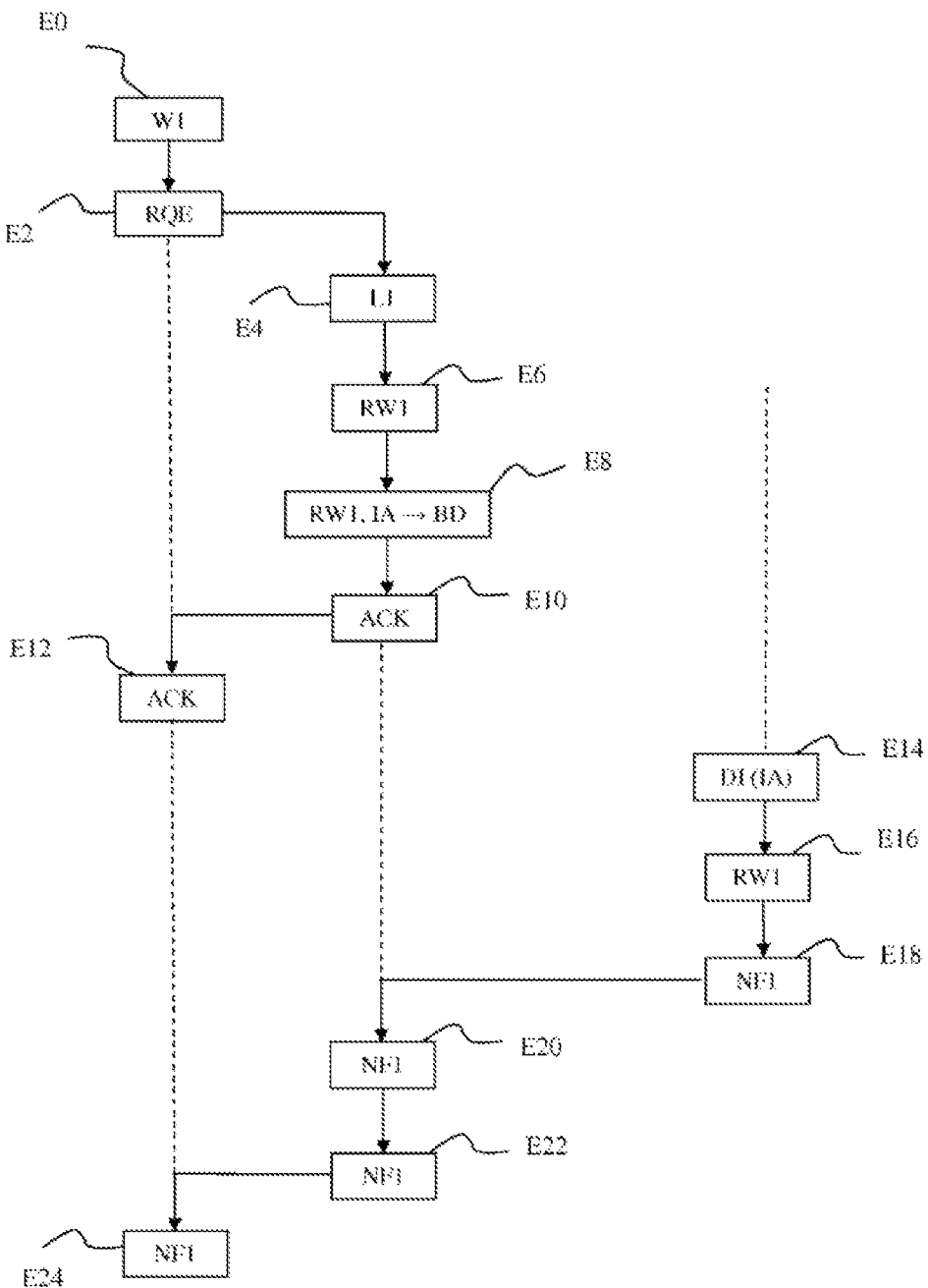
Figure 4:
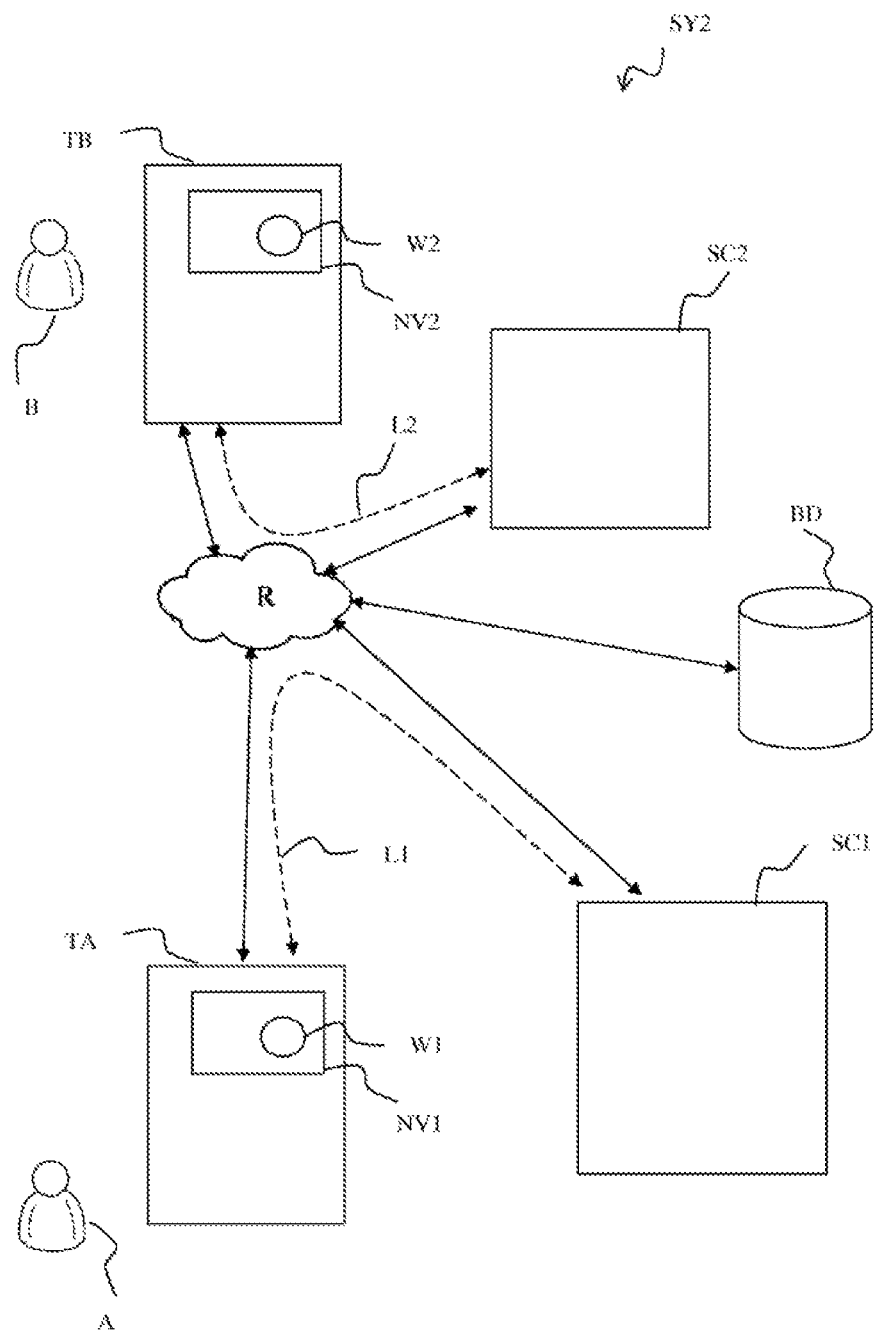
Figure 5:
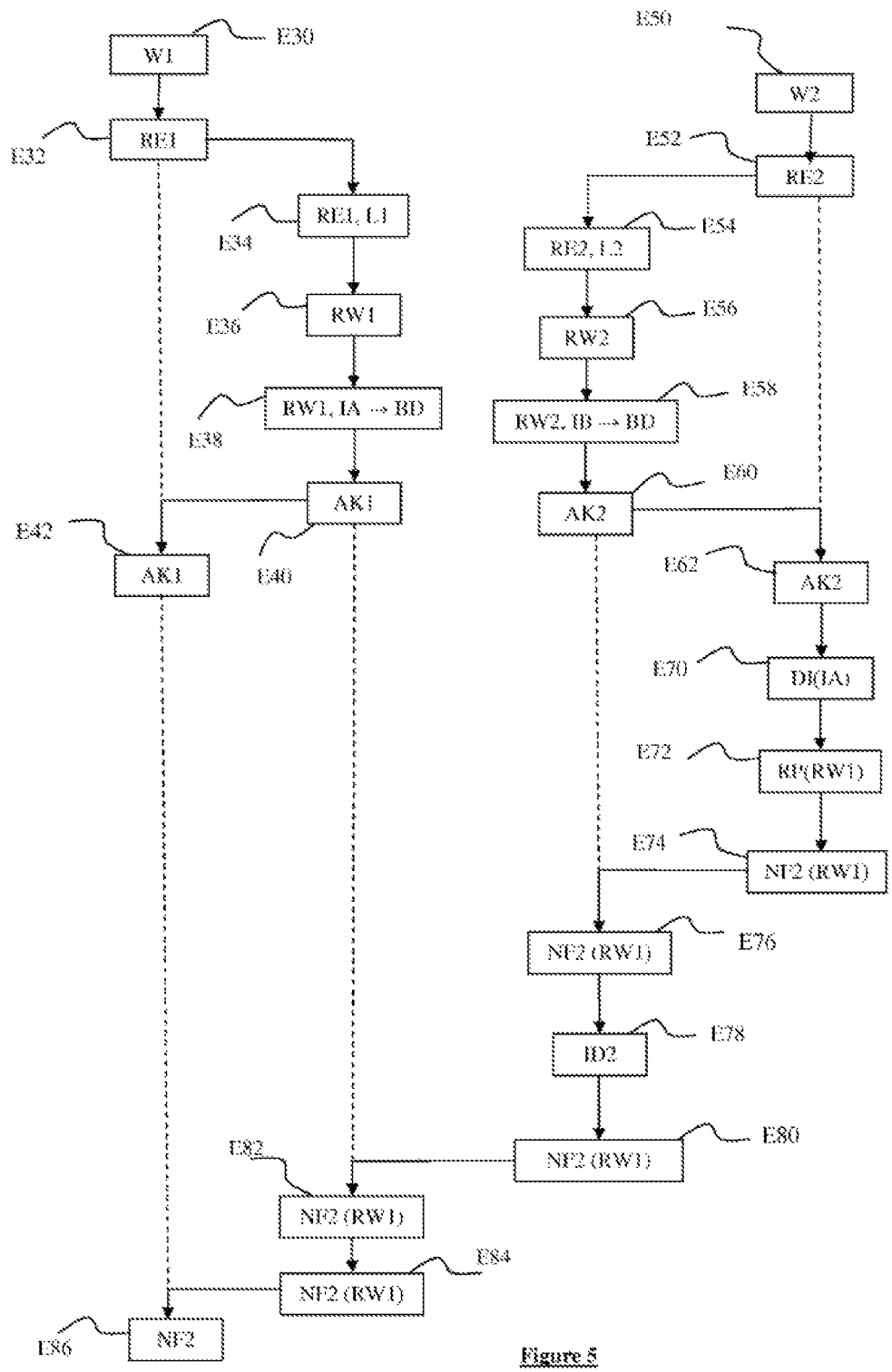
Figure 6:
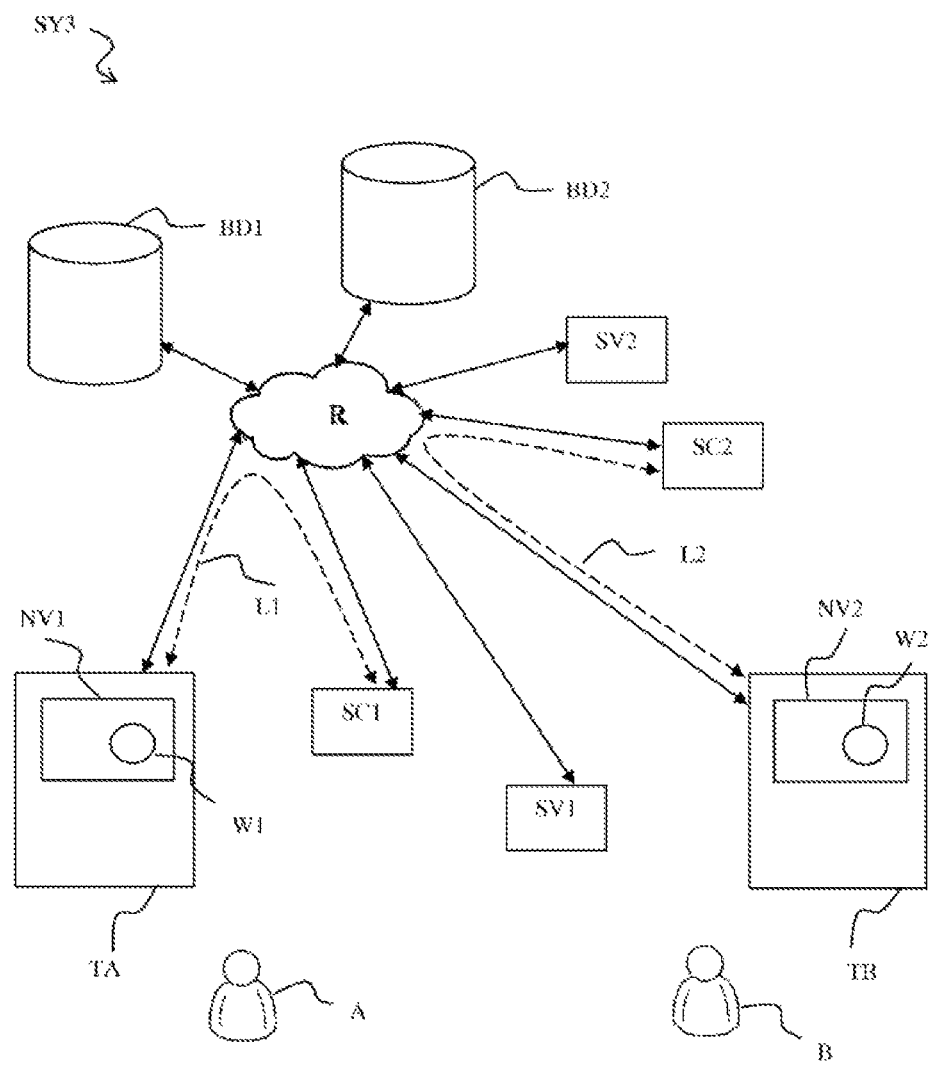
Figure 7:
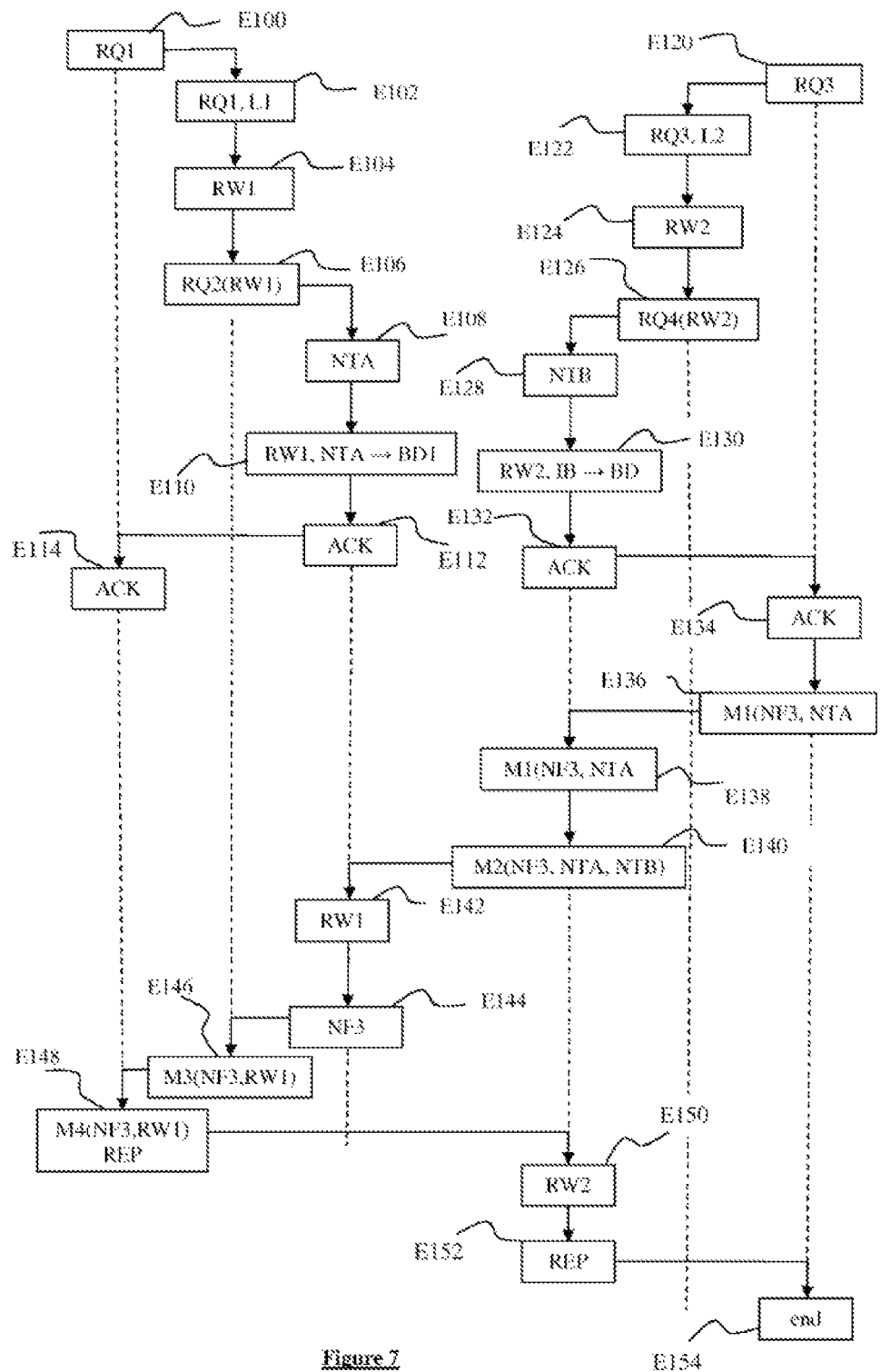
Figure 8:
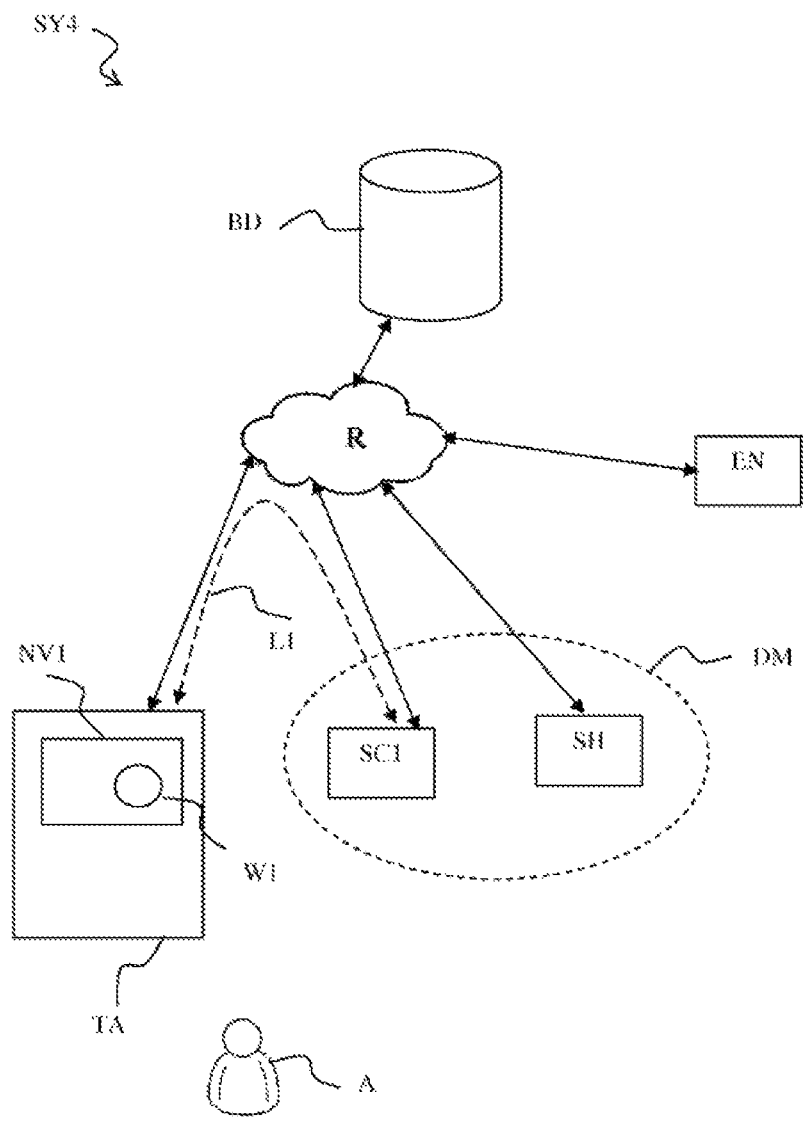
Figure 9:
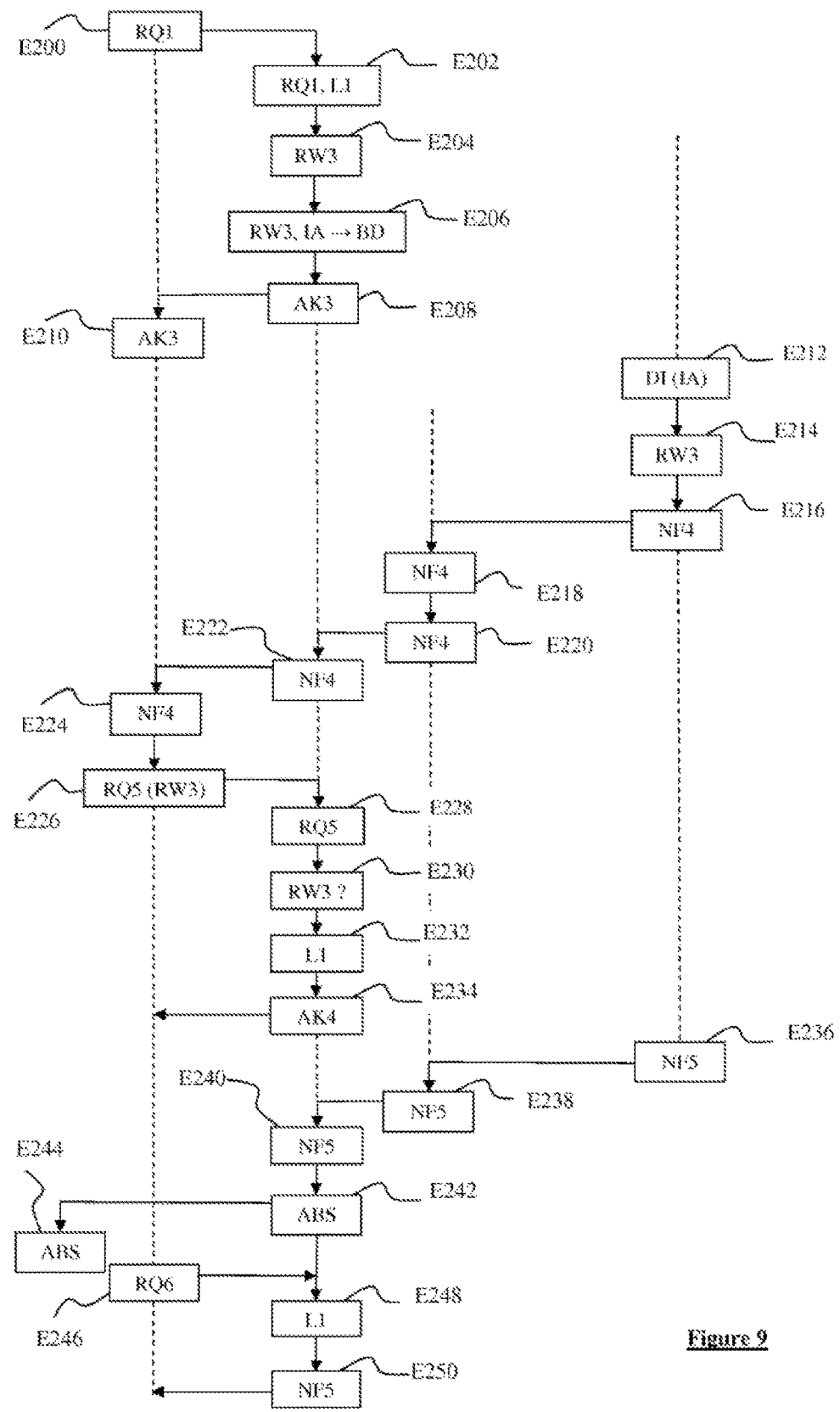

Other features and advantages of the present invention will become apparent in the following description of embodiments given by way of non-limiting examples, with reference to the appended drawings, in which:

FIG. 1 is a diagram illustrating a system of the prior art,

FIG. 2 is a diagram illustrating a system according to a first embodiment of the invention, FIG. 3 is a flow diagram illustrating the various steps of a communication method and of a connection method according to a first embodiment, FIG. 4 is a diagram illustrating a system according to a second embodiment of the invention, FIG. 5 is a flow diagram illustrating the various steps of a communication method and of a connection method according to a second embodiment, FIG. 6 is a diagram illustrating a system according to a third embodiment of the invention, FIG. 7 is a flow diagram illustrating the various steps of a communication method and of a connection method according to a third embodiment, FIG. 8 is a diagram illustrating a system according to a fourth embodiment of the invention, FIG. 9 is a flow diagram illustrating the various steps of a communication method and of a connection method according to a fourth embodiment.

The invention is implemented by means of software and/or hardware components. In this scenario, the term "module" can correspond in this document both to a software component and to a hardware component or to a set of software and/or hardware components, capable of implementing a function or a set of functions, according to what is described hereinbelow for the module in question.

A software component corresponds to one or more computer programs, one or more sub-programs of a program, or more generally, to any element of a program or of a software application. Such a software component is stored in a memory then loaded and executed by a data processor of a physical entity (terminal, server, gateway, set-top-box, router, etc.) and is able to access the hardware resources of this physical entity (memories, recording media, communications bus, input/output electronic boards, user interfaces, etc).

In the same way, a hardware component corresponds to any element of a hardware assembly. This could be a programmable hardware component or with an integrated processor for the software execution, for example an integrated circuit, a smartcard, an electronic board for the execution of a micro-software application (firmware), etc.

A first embodiment of a communication method and of a connection method will now be described with reference to FIGS. 2 and 3.

With reference to FIG. 2, a system SY1 comprises a terminal TA of a user A, a connection server SC1, a caller entity EN and a database BD capable of communicating with each other via a communications network R.

The communications network R comprises the Internet network and/or an intranet network.

The terminal TA is for example a computer of the PC type.

By way of an alternative, the terminal TA is a mobile terminal.

More generally, the terminal TA is a piece of equipment able to access the network R by means of a web browser.

The terminal TA contains a browser NV1 and a module COM1 for communication with the network R.

The browser NV1 is a web browser, in other words a software application designed to consult the World Wide Web.

The caller entity EN is for example a server.

By way of an alternative, the caller entity EN is for example a computer of the PC type, a mobile terminal, a Web application, etc.

More generally, the caller entity EN is an entity capable of communicating with the communications network R, and more particularly accessing the Internet.

The server EN comprises, in a known manner, notably a processing unit MT equipped with a microprocessor, a non-volatile memory of the ROM type, a volatile memory of the RAM type. The caller entity EN may conventionally comprise, and in a non-exhaustive manner, the following elements: a keyboard, a screen, a microphone, a loudspeaker, a disk drive, a storage means, etc.

The non-volatile memory of the ROM type comprises registers storing a computer program PG1 comprising program instructions designed to implement a method of communication according to one embodiment of the invention described hereinbelow with reference to FIG. 3.

The caller entity EN also comprises a module for obtaining an instance identifier OBI and a transmission module MTR.

The connection server SC1 is for example a server and notably comprises, in a known manner, a processing unit UT equipped with a microprocessor, a non-volatile memory of the ROM type, a volatile memory of the RAM type.

The non-volatile memory of the ROM type comprises registers storing a computer program PG2 comprising program instructions designed to implement a connection method according to one embodiment of the invention described hereinbelow with reference to FIG. 3.

The connection server SC1 comprises a communications module CM1 for the communication with other entities of the system SY1 via the network R, a module for establishing a channel MEC, a module for ordering a determination of an instance identifier MGI and a recording module ENR.

A first embodiment of a communication method and of a connection method will now be described with reference to FIG. 3.

During an initial step E0, following an action by the user A, an instance W1 of a Web application is downloaded onto the terminal TA.

In a known manner, the instance of the application W1 is received and recorded by the browser NV1 of the terminal TA in response to a download request transmitted by the browser NV1 of the terminal TA to a download server (not shown).

The application instance received W1 comprises as a parameter an address AD1 of the connection server SC1.

The address AD1 is for example a URL (for "Uniform Resource Locator") associated with the connection server SC1.

By way of an alternative, the application instance W1 comprises several addresses of several connection servers.

Also by way of alternative, the application instance W1 comprises as a parameter an address of a service management server (not shown).

During a step E2, following for example an action by the user A for launching the execution of the application instance W1, the application instance W1 sends a request for establishment of a connection RQE to the connection server SC1 by means of the address AD1 received as a parameter during the downloading of the application instance W1.

The request RQE is transmitted via the module COM1 of the terminal TA and the network R.

By way of an alternative, the address AD1 of the connection server SC1 is not received during the download phase and the address AD1 of the connection server SC1 is received by the application instance W1 in response to an address request made to a service management server whose address has been received as a parameter during the download.

Also, by way of alternative, the address AD1 of the connection server SC1 is obtained by a search of the DNS type (for "Domain Name System").

The request for establishment of a connection RQE is received by the module CM1 of the connection server SC1 during a step E4 and the module for establishment of a channel MEC of the connection server SC1 establishes a communication channel L1 with the browser NV1. The communication channel L1 is for example a connection of the Websocket type.

The communication channel L1 allows, in a known manner, a communication between the connection server SC1 and the browser NV1 and, as a consequence, a communication between the connection server SC1 and the application instance W1.

During a step E6, the module MGI for ordering a determination of an instance identifier of the connection server SC1 orders the determination of an instance identifier RW1 for the application instance W1.

In the embodiment described, the instance identifier RW1 is determined by the connection server SC1.

By way of an alternative, the instance identifier RW1 is determined by a host server or a server central.

The instance identifier RW1 comprises a first identifier ID1 and a second identifier ID2.

The second identifier ID2 allows a host server to be identified within the network R. It is a pointer toward this host server. The host server is a connection server or another server.

In the case where the host server is not the connection server associated with the application instance, the first identifier ID1 is a value or a string of characters allowing, on the one hand, the host server to identify a connection server and, on the other, the connection server identified to identify the communication channel L1.

The first identifier ID1 represents in a unique manner the Web application instance W1 at the host server.

It allows the connection server SC1 to identify the communication channel L1 and, as a consequence, the Web application instance W1 from amongst the application instances which are connected to it. It forms a local pointer toward the communication channel L1.

In the embodiment described where the connection server SC1 represents a host server, the second identifier ID2 allows the connection server SC1 to be identified within the network R and the first identifier ID1 is a value or a string of characters allowing the connection server SC1 to identify the communication channel L1.

The second identifier ID2 is for example a domain name associated with the connection server SC1.

The second identifier ID2 is for example an absolute domain name, also called FQDN (for "Fully Qualified Domain Name"), in other words a domain name that indicates the absolute position of a node representing the connection server SC1 in the tree-diagram of the network R by indicating all the domains with a higher level up to the root.

For example, the second identifier ID2 is "server45.communications.orange.fr".

By way of an alternative, the second identifier is a relative domain name, for example <<communications.orange.fr". In this variant, the generation of the first identifier ID1 is for example centralized within the domain. The first connection server SC1 must be referred to a central entity, for example a database, in order to obtain all or part of the first identifier ID1.

Also, by way of alternative, the first identifier ID1 is determined according to predefined determination rules. For example, each first identifier ID1 comprises a prefix identifying the connection server SC1. According to another example, ranges of numbers are assigned to each connection server by a central server and the connection server SC1 assigns the first identifier ID1 as a function of the assigned range.

The instance identifier RW1 is for example obtained by concatenation of the first identifier ID1 and the second identifier ID2.

The instance identifier is for example a URI (for "Uniform Resource Identifier").

The instance identifier RW1 is for example of the form: "rsi:ID1@ID2" in which "rsi" is a term identifying an instance identifier.

The connection server SC1 records the instance identifier RW1 in a table of correspondence TC of the connection server SC1, in association with a connection identifier IC.

The connection identifier IC is a value or a string of characters allowing the connection server SC1 to find, from amongst the various connection channels established, the communication channel L1 associated with the application instance W1.

The connection identifier IC is for example an identifier of the communication channel L1.

During a step E8, the recording module ENR of the connection server SC1 orders the recording of the instance identifier RW1 in association with a user identifier IA within the database BD.

The user identifier IA is a contactability identifier for the user A, for example a telephone number of a terminal of the user A, for example of the terminal TA or a messaging, service address for the user A. The user identifier IA is specific to the user A. It allows the user A to be identified in a unique manner.

The user identifier IA is for example contained in the request for establishment of a connection RQE.

By way of an alternative, the user identifier IA is for example obtained in response to a user identifier request transmitted to an identity server (not shown) and containing a proof of identity of the user A. The proof of identity is for example obtained during an initial phase for authentication of the user A, by means for example of a login/password pair, and transmitted in the request for establishment of a connection RQE.

By way of an alternative, the recording of the instance identifier RW1 and the procurement of the user identifier IA are carried out by a recording server (not shown) and the step E8 is a step for sending a request for recording the Web application instance W1 to this recording server. The recording request contains the instance identifier RW1 generated during the step E6.

By way of an alternative, the recording request also contains information specific to the service During a step E10, the connection server SC1 sends an acknowledgement message ACK to the application instance W1 via the communication channel L1 and the browser NV1.

The acknowledgement message ACK constitutes a proof of the establishment of the communication channel L1.

The acknowledgement message ACK contains the instance identifier RW1.

By way of an alternative, the acknowledgement message ACK does not contain the instance identifier RW1.

The acknowledgement message ACK is received by the application instance W1 during a step E12 and a message indicating to the user that the connection is established is for example displayed on a graphical interface of the browser NV1.

During a step E14, later than the step E12, the module for obtaining an instance identifier OBI of the caller entity EN sends an instance identifier request DI for the user A to the database BD. The request DI contains the identifier IA of the user A.

During a step E16, the module for obtaining an instance identifier OBI obtains in response to the request DI, the instance identifier RW1 recorded in association with the user identifier IA in the database BD.

During a step E18, the transmission module MTR of the caller entity EN sends a notification NF1 containing the instance identifier RW1 destined for the application instance W1 via the network R.

In a known manner, the notification NF1 contains, or is associated with, a sender address and a destination address.

The sender address is an address of the caller entity EN.

The destination address is the instance identifier RW1.

The notification NF1 also contains a message M in the form of a string of characters.

By way of an alternative, the notification NF1 is a request for establishment of a flux bidirectional audio and/or video datastream, for example a telephone conversation, or the transmission of an audio and/or video content.

The instance identifier RW1, and consequently the destination address of the notification NF1 contains the second identifier ID2. The second identifier ID2 corresponding to an address of the connection server SC1, the notification NF1 is transmitted to the connection server SC1 and received by the connection server SC1, during a step E20.

During a step E22, the connection server SC1 transfers the notification NF1 to the application instance W1 via the communication channel L1.

The step E22 comprises, for example, the extraction of the notification NF1, from the first identifier ID1 of the instance identifier RW1, and the obtaining of the connection identifier IC by consulting the table of correspondence TC.

During a step E24, the application instance W1 receives the notification NF1 and the content of the notification NF1 is processed by the application instance W1.

For example, the message M is displayed on the screen of the terminal TA.

By way of an alternative, the notification NF1 is a telephone call and, when the notification NF1 is received, the application instance W1 informs the user of the terminal TA of the call and, if the user answers, a process for establishment of a call is executed. The communication is for example established according to a protocol WebRTC ("web Real-Time Communication").

The steps E14, E16 and E18, implemented by the caller entity EN, represent the steps of the communication method.

The steps E4, E6, E8 and E10, implemented by the connection server SC1, represent the steps of the connection method.

A second embodiment of a communication method and of a connection method will now be described with reference to FIGS. 4 and 5.

With reference to FIG. 4, a system SY2 comprises a first terminal TA of a first user A, a second terminal TB of a second user B, a first connection server SC1, a second connection server SC2, and a database BD able to communicate with one another via a telecommunications network R.

The first terminal TA and the second terminal TB are for example mobile terminals.

By way of an alternative, the first and/or the second terminal is a computer of the PC type.

The first terminal TA also contains a first browser NV1.

The second terminal TB contains a second browser NV2.

A second embodiment of a communication method and of a connection method implemented in the system SY2 will now be described with reference to FIG. 5.

During an initial step E30, similar to the step E0, following an action by the user A, a Web application instance W1 of a first Web application is downloaded onto the terminal TA.

The application instance received W1 comprises as a parameter an address AD1 of the first connection server SC1, for example a URL associated with the first connection server SC1.

During a step E32, similar to the step E2, the application instance W1 sends a request for establishment of a connection RE1 to the first connection server SC1 by means of the address AD1 received as a parameter during the download of the application instance W1.

The request for establishment of a connection RE1 is received by the first connection server SC1 during a step E34 and the first connection server SC1 establishes a communication channel L1 with the browser NV1. The communication channel L1 is for example a connection of the Websocket type.

During a step E36, similar to the step E6, the first connection server SC1 determines an instance identifier RW1. The instance identifier RW1 comprises a first identifier ID1 and a second identifier ID2. The first identifier ID1 is determined by the first connection server SC1. This identifier represents, in a unique manner, the Web application instance W1 in the first connection server SC1.

The second identifier allows the connection server SC1 to be identified within the network R. The second identifier is for example the fully-qualified domain name or FQDN of the first connection server SC1.

During a step E38, similar to the step E8, the first connection server SC1 obtains a user identifier IA, for example an address of messaging service assigned to the user A, and orders the recording of the instance identifier RW1 in association with the user identifier IA in the database BD.

During a step E40, the first connection server SC1 sends an acknowledgement message AK1 to the application instance W1 via the communication channel L1 and the browser NV1.

The acknowledgement message AK1 is received by the application instance W1 during a step E42.

The steps E32 to E42 allow, on the one hand, the recording of the application instance W1 to be carried out and, on the other, the establishment of a first communication channel between the first connection server SC1 and the application instance W1.

During an initial step E50, following an action by the user B, a Web application instance W2 of a second Web application is downloaded onto the second terminal TB.

The received application instance W2 comprises as a parameter an address AD2 of the second connection server SC2.

During a step E52, the application instance W2 sends a request for establishment of a connection RE2 to the second connection server SC2 by means of the address AD2.

The request for establishment of a connection RE2 is received by the second connection server SC2 during a step E54 and the connection server SC2 establishes a communication channel L2 with the web browser NV2.

During a step E56, the second connection server SC2 determines an instance identifier RW2. The instance identifier RW2 comprises a first identifier ID3 and a second identifier ID4. The first identifier ID3 is determined by the second connection server SC2. The first identifier ID3 represents, in a unique manner, the Web application instance W2 in the second connection server SC2.

The second identifier ID4 allows the second connection server SC2 to be identified. The second identifier ID4 is for example the fully-qualified domain name or FQDN of the second connection server SC2.

During a step E58, the second connection server SC2 obtains a user identifier 1B of the user B, for example a messaging service address assigned to the user B, and orders the recording of the instance identifier RW2 in association with the user identifier 1B in the database BD.

During a step E60, the second connection server SC2 sends an acknowledgement message AK2 to the application instance W2 via the communication channel L2 and the web browser NV2.

The acknowledgement message AK2 is received by the application instance W2 during a step E62.

The steps E52 to E62 allow, on the one hand, the recording of the application instance W2 of the second application to be carried out and, on the other, the establishment of a second communication channel L2 between the second connection server SC2 and the application instance W2.

The steps E50 to E62 are respectively similar to the steps E30 to E42 described previously. They are however carried out independently, prior to, after or simultaneously with the steps E30 to E42.

During a step E70, carried out after the reception of the acknowledgement AK2 transmitted during the step E62, the application instance W2 sends a request for an instance identifier DI to the database BD. The request DI contains the user identifier IA of the user A.

During a step E72, the application instance W2 receives a response RP to the request DI. The response RP contains the instance identifier RW1 associated with the identifier IA in the database BD.

In the case where the application instance W1 is not recorded (steps E32 to E42 not executed), no instance identifier is recorded in association with the user identifier IA in the database BD. The step E52 is then a step for receiving a message informing of the absence of the instance identifier sought and the process comes to a halt. By way of an alternative, no response is received.

During a step E74, the application instance W2 sends a notification NF2, containing the instance identifier RW1 obtained, destined for the application instance W1 via the network R.

The notification NF2 also contains for example a text or vocal message formulated by the user B.

By way of an alternative, the notification NF2 is a request for establishment of a bidirectional audio and/or video datastream, for example a telephone conversation, or the transmission of an audio and/or video content.

The application instance W2 represents a caller entity.

The notification NF2 is transmitted via the second communication channel L2.

The notification NF2 is received by the second communication server SC2 during a step E76.

During a step E78, the second connection server SC2 extracts the second identifier ID2 of the instance identifier RW1 contained in the notification NF2.

The second identifier ID2 is an address of the first connection server SC1.

During a step E80, the second connection server SC2 transmits the notification NF2 to the first connection server SC1 using the extracted second identifier ID2.

The notification NF2 is received by the first communication server SC1 during a step E82.

During a step E84, the first connection server SC1 transfers the notification NF2 to the application instance W1 via the first communication channel L1 using the first identifier ID1 of the instance identifier RW1 contained in the notification NF2.

The step E84 comprises the extraction from the received notification NF2 of the first identifier ID1 of the instance identifier RW1.

During a step E86, the application instance W1 receives the notification NF2.

By way of an alternative, the notification NF2 is a telephone call and when the notification NF2 is received, the application instance W1 informs the user of the terminal A of the call and, if the user answers, a process for establishment of a call is executed. The communication is for example established according to a WebRTC protocol.

The steps E70, E72 and E74, implemented by the application instance W2, represent the steps of the communication method.

The steps E32 to E42, implemented by the first connection server SC1, represent the steps of a connection method.

The steps E52 to E62, implemented by the second connection server SC2, represent the steps of a connection method.

In one variant embodiment, the instance identifier RW2 is inserted into the notification NF2 by the second server of notification SC2 during the step E80. It is then transmitted to the first connection server SC1 and, potentially, to the application instance W1.

With reference to FIG. 6, a system SY3 comprises a first terminal TA of a first user A, a second terminal TB of a second user B, a first connection server SC1, a second connection server SC2, a first service management server SV1, a second service management server SV2, a first database BD1 and a second of database BD2 capable of communicating with one another via a telecommunications network R.

The first terminal TA and the second terminal TB are for example mobile terminals.

By way of an alternative, the first and/or the second terminal is a terminal fixe.

The first terminal TA contains a first browser NV1.

The second terminal TB contains a second web browser NV2.

A third embodiment of a communication method and of a connection method implemented in the system SY3 will now be described with reference to FIG. 7.

During an initial step E100, a Web application instance W1 downloaded onto the terminal TA sends to the first connection server SC1 a request for establishment of a connection RQ1. The request RQ1 comprises as a parameter an address of the first service management server SV1.

The address of the first connection server SC1 is for example contained in the downloaded application instance.

By way of an alternative, the address of the first connection server SC1 is for example obtained by a search of the DNS type.

The request for establishment of a connection RQ1 is received by the first connection server SC1 during a step E102 and the first connection server SC1 establishes a communication channel L1 with the first browser NV1.

During a step E104, the first connection server SC1 determines an instance identifier RW1. The instance identifier RW1 comprises a first identifier ID1 and a second identifier ID2. The first identifier ID1 is determined by the first connection server SC1 and represents, in a unique manner, the Web application instance W1 in the first connection server SC1. It allows the first connection server SC1 to identify the Web application instance W1 from amongst the application instances that are connected to it.

The second identifier ID2 allows the first connection server SC1 to be identified within the network R. The second identifier ID2 is for example a fully-qualified domain name (FQDN) associated with the first connection server SC1.

During a step E106, the first connection server SC1 transmits a service request RQ2 to the first service management server SV1. The service request RQ2 comprises the instance identifier RW1 determined during the step E104.

During a step E108, the first service management server SV1 obtains a user identifier NTA for the user A. The user identifier NTA is for example the telephone number of the terminal A.

The user identifier NTA is for example obtained in response to a request of user identifier transmitted to an identity server (not shown) and containing a proof of identity of the user A. The proof of identity is for example obtained by the terminal TA during an initial phase for authentication of the user A and transmitted in the request for establishment of a connection RQ1 and in the service request RQ2.

By way of an alternative, the user identifier NTA is contained in the request for establishment of a connection RQ1 and retransmitted in the service request RQ2.

During a step E110, the first service management server SV1 verifies the validity of the service request RQ2. For example, it verifies whether the user A is authorized to use the services provided by the first service management server SV1.

If the service request RQ2 is not valid, the first service management server SV1 sends to the Web application W1, via the first connection server SC1 and the communication channel L1 established, a message indicating that the request is invalid and commands the first connection server SC1 to end the connection L1 with the browser NV1. The process comes to a halt.

If the service request RQ2 is valid, the first service management server SV1 orders the recording in the first database BD1 of the instance identifier RW1 in association with the user identifier NTA.

During a step E112, the first service management server SV1 sends an acknowledgement message AQ1 constituting a proof of the recording of the application instance W1, via the first connection server SC1 and the communication channel L1.

The acknowledgement message AQ1 is received by the application instance W1 during a step E114.

During an initial step E120, an application instance of a second Web application W2, downloaded onto the terminal TB, sends a request for establishment of a connection RQ3 to the second connection server SC2. The request RQ3 comprises as a parameter an address of the second service management server SV2.

The request for establishment of a connection RQ3 is received by the second connection server SC2 during a step E122, and the second connection server SC2 establishes a second communication channel L2 with the second web browser NV2.

During a step E124, the second connection server SC2 determines a second instance identifier RW2. The instance identifier RW2 comprises a first identifier ID3 and a second identifier ID4. The first identifier ID3 is determined by the second connection server SC2. The first identifier ID3 represents, in a unique manner, the Web application instance W2 in the second connection server SC2. It allows the second connection server SC2 to identify the Web application W2 from amongst the application instances that are connected to it.

The second identifier ID4 allows the second connection server SC2 to be identified within the network R. The second identifier ID4 is for example the fully-qualified domain name (FQDN) associated with the second connection server SC2.

During a step E126, the second connection server SC2 transmits a second service request RQ4 to the second service management server SV2. The second service request RQ4 comprises the second instance identifier RW2 determined during the step E124.

During a step E128, the second service management server SV2 obtains a user identifier NTB for the user B. The user identifier NTB is for example the telephone number of the terminal B.

The user identifier NTB is for example obtained in response to a request for user identifier transmitted to an identity server (not shown) and containing a proof of identity of the user B. The proof of identity is for example obtained during an initial phase for authentication of the user B and transmitted in the second request for establishment of a connection RQ3 and in the service request RQ4.

By way of an alternative, the user identifier NTB is contained in the request for establishment of a connection RQ3 and in the second service request RQ4.

During a step E130, the second service management server SV2 verifies the validity of the second service request.

If the service request is not valid, the second service management server SV2 sends a message indicating that the request is invalid to the instance Web application W2, via the second connection server SC2 and the second communication channel L2 established, and commands the second connection server SC2 to terminate the connection L2 with the web browser NV2. The process comes to a halt.

If the service request RQ4 is valid, the second service management server SV2 orders the recording in the second database BD2, of the second instance identifier RW2 in association with the user identifier NTB.

During a step E132, the service management server SV2 sends an acknowledgement message AQ2 constituting a proof of the recording of the application instance W2, via the second connection server SC2 and the communication channel L2.

The acknowledgement message AQ2 is received by the application instance W2 during a step E134.

During a step E136, the application instance W2 sends a message M1 to the second service management server SV2, via the second communication channel L2 and the second connection server SC2.

The message M1 comprises the telephone number NTA of the terminal TA and a notification NF3. The telephone number NTA of the terminal A represents a user identifier. The notification NF3 is for example a request for establishment of a call or a request to open a communication channel between the application instance W1 and the application instance W2.

During a step E138, the second service management server SV2 receives the message M1.

During a step E140, the second service management server SV2 obtains the telephone number NTB of the terminal TB, inserts the telephone number NTB obtained in the message M1 and transmits a message M2 corresponding to the message M1 thus modified to the first service management server SV1.

During a step E142, the first service management server SV1 extracts from the received message M2 the telephone number NTA and obtains, by consulting the first database BD1, the instance identifier RW1 associated with the telephone number NTA.

The second identifier ID2 contained in the instance identifier RW1 obtained being associated with the first connection server SC1, the first service management server SV1 transmits, during a step E144, a message M3 containing the notification NF3, the telephone number NTB of the terminal TB and the instance identifier RW1 to the first connection server SC1.

During a step E146, the first connection server SC1 having received the message M3, re-transmits a message M4 containing the notification NF3, the telephone number NTB and the instance identifier RW1 to the application instance W1, via the communication channel L1.

By way of an alternative, the instance identifier RW1 is not transmitted in the message M4.

During a step E148, the application instance W1 receives the message M4 and sends a response REP to the notification NF3. The response REP is transmitted to the second service management server SV2, via the first communication channel L1, the first connection server SC1 and the first service management server SV1.

During a step E150, the second service management server SV2 obtains the instance identifier RW2 associated with the telephone number NTB in the second database BD2.

During a step E152, the second service management server SV2 sends the response REP to the application instance W2, via the second connection server SC2 and the second communication channel L2, and establishes a communication with the first service management server SV1.

The communication established thus allows the application instances W1 and W2 to communicate.

During a step E154, one of the correspondents, for example the user B, terminates the communication, for example by means of a graphical interface of the web browser NV2.

A request to end the communication is transmitted to the second service management server SV2 which manages the end of communication.

One of the users may also request the execution of an application instance to be stopped. An end of connection request is then transmitted by the application instance to the connection server to which it is connected.

Upon receiving the request, the connection server interrupts the communication channel that it had established with the application instance.

A fourth embodiment will now be described with reference to FIGS. 8 and 9.

With reference to FIG. 8, a system SY4 comprises a terminal TA of a user A, a connection server SC1, a host server SH, a caller entity EN and a database BD capable of communicating with one another via a communications network R.

The terminal TA is for example a mobile terminal.

By way of an alternative, the terminal A is a fixed terminal.

The first terminal TA contains a browser NV1.

The connection server SC1 and the host server SH belong to the same domain DM, for example the domain "orange.fr".

The host server SH has for example the absolute domain name "accueil.orange.fr".

The connection server SC1 has for example the absolute domain name "serverSC1.accueil.orange.fr".

The caller entity EN is for example a server.

The database BD is accessible by the connection server SC1, by the host server SH and by the caller entity EN and, more generally, by any entity able to be connected to the network R.

A fourth embodiment of a communication method and of a connection method implemented in the system SY4 will now be described with reference to FIG. 9.

During an initial step E200, a Web application instance W1 downloaded onto the terminal TA, sends a request for establishment of a communication RQ1 to the connection server SC1. The request comprises as a parameter an address of the connection server SC1.

The request for establishment of a connection RQ1 is received by the connection server SC1 during a step E202, and the connection server SC1 establishes a communication channel L1 with the browser NV1.

During a step E204, the connection server SC1 analyses the request received for establishment of a connection RQ1 in order to determine whether it comprises an instance identifier. If the request does not comprising an instance identifier RW3, the connection server SC1 orders the determination of an instance identifier RW3.

In this embodiment, the instance identifier RW3 is determined by the connection server SC1.

The instance identifier RW3 comprises a first identifier ID5 and a second identifier ID6.

The second identifier ID6 allows the host server SH to be identified.

The second identifier ID6 is for example a domain name "accueil.orange.fr" to which the host server SH and the connection server SC1 belong.

The second identifier ID6 is a relative domain name for the connection server SC1.

By way of an alternative, the second identifier is a fully-qualified domain name (FQDN), for example "serverSC1.accueil.orange.fr".

The first identifier ID5 is determined by the connection server SC1. The first identifier ID5 is for example a string of characters comprising a prefix identifying the connection server SC1, for example "serverSC1" followed by an identifier IC of the communication channel L1.

The second identifier ID6 is a pointer toward the domain DM.

The first identifier ID5 consists of a pointer, internal to the domain, toward the connection server SC1 then toward the communication channel L1.

The first identifier ID5 represents, in a unique manner, the Web application instance W1 in the domain DM. It allows, on the one hand, the host server SH to identify the connection server SC1 to which the application instance is connected and, on the other hand, the connection server SC1 to identify the Web application instance W1 from amongst the applications that are connected to it.

During a step E206, the connection server SC1 obtains a user identifier IA and orders the recording of the instance identifier RW3 in association with the user identifier IA in the database BD.

During a step E208, the connection server SC1 sends an acknowledgement message AK3 to the application instance W1 via the communication channel L1 and the browser NV1.

The acknowledgement message AK3 constitutes a proof of the establishment of the communication channel L1 and of the recording of the application instance W1 within the domain DM.

The acknowledgement message AK3 contains the instance identifier RW3.

The acknowledgement message AK3 is received by the application instance W1 during a step E210, and a message indicating to the user that the connection is established is for example displayed on a graphical interface of the browser NV1.

During a step E212, later than the step E210, the caller entity EN sends a request DI for an instance identifier for the user A to the database BD. The request DI comprises the identifier IA of the user A.

During a step E214, the caller entity EN obtains, in response to the request DI, the instance identifier RW3 recorded in association with the user identifier IA in the database BD.

During a step E216, the caller entity EN sends a notification NF4 containing the instance identifier RW3 to the application instance W1 via the network R.

The notification NF4 contains, in a known manner, a sender address and a destination address. The sender address is an address of the caller entity EN. The destination address is the instance identifier RW3.

The notification NF4 contains for example a message in the form of a string of characters.

By way of an alternative, the notification NF4 is a request for establishment of a bidirectional audio and/or video datastream, for example a telephone conversation, or the transmission of an audio and/or video content.

The instance identifier RW3 and, as a consequence, the destination address for the notification NF4 contain the second identifier ID6 of the instance identifier RW3. The second identifier ID6 corresponding to an address of the host server SH, the notification NF4 is transmitted to the host server SH and received by the host server SH, during a step E218.

During a step E220, the host server SH having received the notification NF4 extracts the first identifier ID5 from the instance identifier RW3 and identifies that the instance identifier RW3 has been determined by the connection server SC1 by means of the prefix contained in the first identifier ID5.

Then, the host server SH transfers the notification NF4 to the connection server SC1.

The address of the connection server SC1 is not known to the caller entity EN.

During a step E222, the connection server SC1 receives the notification NF4, determines by means of the first identifier ID5 of the instance identifier RW3 that it is destined for the application instance W1 and transfers the notification NF4 to the application instance W1 via the communication channel L1.

During a step E224, the application instance W1 receives the notification NF4 and the notification NF4 is processed by the application instance W1.

For example, the notification NF4 is a telephone call and when the notification NF4 is received, the application instance W1 informs the user of the terminal A of the call and, if the user answers, a process for establishment of a call is executed. The communication is for example established according to a WebRTC protocol.

Later on, following for example a network problem, the communication channel L1 established between the application instance W1 and the connection server SC1 is interrupted.

Following a detection of the interruption, the application instance W1 transmits, during a step E226, a new request for establishment of a connection RQ5 to the connection server SC1. The new request for establishment of a connection comprises the instance identifier RW3.

By way of an alternative, the new request for establishment of a connection RQ5 is transmitted following a command by the user A from the terminal TA.

During a step E228, the connection server SC1 receives the request for establishment of a connection RQ5 and extracts the instance identifier RW3 from the request RQ5.

Then, during a step E230, the connection server SC1 analyses the request for establishment of a connection RQ5 in order to determine whether it comprises an instance identifier. The request comprising the instance identifier RW3, the connection server SC1 verifies if the instance identifier RW3 is an identifier that it has previously determined.

If the instance identifier RW3 is an identifier determined by the connection server SC1, the connection server SC1 re-establishes the communication channel L1 with the first browser NV1 (step E232).

The step E232 is followed by the step E234 during which the connection server SC1 sends an acknowledgement message AK4 to the application instance W1 via the communication channel L1 and the browser NV1.

Thus, the application instance W1 can again receive notifications.

Later on, the communication channel L1 is again interrupted.

The rupture of the communication channel L1 is for example due to a network problem or is caused by the user A, for example by stopping the execution of the application instance W1 by the user.

During a step E236, the caller entity EN sends a new notification NF5 to the application instance W1.

The notification NF5 contains the instance identifier RW3.

The notification NF5 is received by the host server SH during a step E238.

The host server SH transfers the notification NF5 to the connection server SC1.

During a step E240, the notification NF5 is received by the connection server SC1.

During a step E242, the connection server SC1 detects that the communication channel L1 is interrupted and sends a wake-up request ABS. The wake-up request ABS tells that terminal TA about the arrival of a notification and the absence of a channel between the terminal TA and the connection server SC1.

The wake-up request ABS is for example a message of the SMS (for "short Message Service") type or a notification of the "PUSH" type.

During a step E244, the terminal TA receives the message ABS and, either automatically, or by the action of a user action, the application instance W1 sends, during a step E246, a new request for establishment of a communication RQ6 comprising the instance identifier RW3 to the connection server SC1.

After having received the request for establishment of a connection RQ6, the connection server SC1 re-establishes the communication channel L1 with the browser NV1 (step E248).

Then, during a step E250, the connection server SC1 transmits the notification NF5 to the application instance W1.

The invention claimed is:

1. A method for communication between a caller entity (EN, W2) and an instance of a web application (W1) downloaded within a web browser of a user terminal (TA) and designed to be connected to a connection server (SC1)

via a connection channel, wherein the method comprises the following steps, implemented in the caller entity:
- transmitting a request containing an identifier (IA, NTA) of a user of the terminal (TA);
- obtaining (E16, E72, E142, E214), in answer, of an instance identifier (RW1) for said application instance (W1), said identifier (RW1) being determined during a phase of connection of said application instance to the connection server and stored in association with the user identifier and comprising a first identifier (ID1) and a second identifier (ID2), the second identifier (ID2) being a pointer towards a host server (SC1, SH) and the first identifier (ID1) allowing the host server to identify the connection server if the host server is different from the connection server and allowing the connection server to identify the application instance from amongst the application instances which are connected to the connection server; and
- transmission (E18, E74) of a notification (NF1, NF2) destined for said application instance (W1) by means of said instance identifier (RW1) obtained.

2. The communication method as claimed in claim 1 in which the obtaining comprises:
- sending a request (E14) for the instance identifier (DI) comprising a user identifier (IA); and
- receiving a response (E16) to said request containing said instance identifier (RW1).

3. The communication method as claimed in claim 1, in which said application instance is an instance (W1) of a first application connected to a first connection server (SC1) and the caller entity is the entity instance (W2) of a second application connected to a second connection server (SC2).

4. The communication method as claimed in claim 1 in which the obtaining comprises receiving a message containing the instance identifier (RW1) transmitted by said application instance (W1).

5. A connection method implemented by a connection server (SC1), the method comprising:
- following reception (E4, E34, E204) of a request for establishment of a connection (RQE, RE1, RQ1) originating from an instance of a web application (W1) downloaded within a web browser of a terminal (TA) of a user, analyzing (E204, E230) of the received request in order to determine if the received request comprises an application instance identifier; and
- if said request does not comprise the application instance identifier, ordering a determination of the application instance identifier (RW1, RW3), wherein the application identifier comprises a first identifier (ID1, ID5) and a second identifier (ID2, ID6), the second identifier being a pointer toward a host server (SC1, SH) and the first identifier allowing the host server to identify the connection server if the host server is different from the connection server and allowing the connection server to identify the application instance from amongst the application instances which are connected to the connection server; and establishing a communication channel between said web application instance and the connection server via the web browser; and
- if said request comprises the application instance identifier, verifying that the application instance identifier is an identifier previously determined by the connection server and re-establishing the communication channel between said web application instance and the connection server via the web browser if it is determined that the application instance identifier is an identifier previously determined by the connection server.

6. The connection method as claimed in claim 5, in which the second identifier is a domain name associated with the host server.

7. The connection method as claimed in claim 5, characterized in that it comprises a step for transmission (E106) of said identifier of said instance with a view to the recording of said instance identifier (RW1) in association with a user identifier (NTA).

8. The connection method as claimed in claim 5, characterized in that it comprises a step for receiving (E20) a notification (NF1) containing said instance identifier, and a step for transmission of said notification to said application instance (W1).

9. The connection method as claimed in claim 8, characterized in that it comprises, following the reception of the notification, a step for sending (E242) a wake-up request to the user terminal and a step for receiving a second request for establishment of a connection, said request comprising said instance identifier.

10. A caller entity (EN) comprising:
- a processor; and
- a non-transitory computer-readable memory storing:
  - a module (OBI) for obtaining an instance identifier (RW1) of an instance (W1) of a web application downloaded within a web browser of a user terminal (TA), said instance identifier comprising a first and a second identifier, the second identifier being a pointer toward a host server and the first identifier allowing the host server to identify the connection server if the host server is different from the connection server and allowing the connection server to identify the application instance from amongst the application instances which are connected to the connection server; and
  - a module (MTR) for transmission of a notification (NF1) destined for said application instance (W1) by means of said instance identifier obtained (RW1) and transmission of a request containing an identifier (IA, NTA) of a user of the terminal (TA).

11. A connection server (SC1) comprising:
- a processor; and
- a non-transitory computer-readable memory storing:
  - a communications module for receiving a request for establishment of a connection originating from an instance of a web application downloaded within a web browser of a terminal of a user; and
  - a module for analyzing (E204, E230) of the request in order to determine if the request comprises an instance identifier: and
  - a module (MGI) for ordering a determination of the application instance identifier if said request for establishment of a connection does not comprise an instance identifier, wherein the instance identifier comprises a first and a second identifier, the second identifier being a pointer toward a host server and the first identifier allowing the host server to identify the connection server if the host server is different from the connection server and allowing the connection server to identify the application instance from amongst the application instances which are connected to the connection server;
  - a module for verifying in case of said request comprises the application instance identifier, that the application instance identifier is an identifier previously determined by the connection server;
  - a module for establishing a communication channel between said web application instance and the connection server via the web browser if the request does not comprise the application instance identifier and for re-establishing the communication channel between said web application instance and the connection server via the web browser if it is determined that the application instance identifier contained in the request is an identifier previously determined by the connection server.

* * * * *

UNITED STATES PATENT AND TRADEMARK OFFICE
CERTIFICATE OF CORRECTION

PATENT NO. : 10,158,587 B2
APPLICATION NO. : 14/762110
DATED : December 18, 2018
INVENTOR(S) : Emmanuel Bertin et al.

It is certified that error appears in the above-identified patent and that said Letters Patent is hereby corrected as shown below:

In the Specification

In Column 11, Line 2, please replace "user identifier 1B" with -- user identifier IB --.

In Column 11, Line 5, please replace "user identifier 1B" with -- user identifier IB --.

Signed and Sealed this
Twenty-sixth Day of November, 2019

Andrei Iancu
*Director of the United States Patent and Trademark Office*